US007545587B2

(12) United States Patent
Kubota

(10) Patent No.: US 7,545,587 B2
(45) Date of Patent: Jun. 9, 2009

(54) IMAGING LENS

(75) Inventor: Takashi Kubota, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 39 days.

(21) Appl. No.: 11/702,577

(22) Filed: Feb. 6, 2007

(65) Prior Publication Data

US 2007/0177278 A1 Aug. 2, 2007

(30) Foreign Application Priority Data

Feb. 27, 2006 (JP) ............................ 2006-049925

(51) Int. Cl.
*G02B 9/34* (2006.01)

(52) U.S. Cl. ...................................... 359/774; 359/771

(58) Field of Classification Search ......... 359/755–758, 359/763, 764, 771, 772, 774, 784, 785, 793, 359/795

See application file for complete search history.

(56) References Cited

U.S. PATENT DOCUMENTS 5,677,798 A * 10/1997 Hirano et al. ............... 359/717
6,813,099 B2 11/2004 Yamaguchi
2006/0132933 A1 6/2006 Nio et al.
2006/0158743 A1 7/2006 Nio et al.

FOREIGN PATENT DOCUMENTS

JP 2000-180719 6/2000
JP 2002-365531 12/2002
JP 2004-053813 A 2/2004
JP 2004-102234 A 4/2004

* cited by examiner

*Primary Examiner*—Darryl J Collins
(74) *Attorney, Agent, or Firm*—Foley & Lardner LLP

(57) ABSTRACT

The imaging lens is configured to include, in an order arranged from an object side: a first lens having a substantially convex surface formed at the object side and having a positive refractive power; a second lens constituted of a meniscus lens having a substantially concave surface formed at the object side and having a negative refractive power; a third lens having substantially convex surfaces formed at both sides, respectively; and a fourth lens constituted of a meniscus lens having a substantially convex surface at the object side and having a positive refractive power. Further, a space of at least 1.0 mm is ensured between the first lens and the second lens. This allows a diaphragm mechanism of a certain thickness having a diaphragm to be arranged between the first lens and the second lens.

12 Claims, 4 Drawing Sheets

IMAGING LENS

BACKGROUND OF THE INVENTION

1. Field of the Invention

The present invention relates to a compact light-weight imaging lens to be used in a camera in which a solid-state imaging device such as a charge coupled device (CCD) and a complementary metal-oxide semiconductor (CMOS) is mounted.

2. Description of the Related Art

Recently, demands are growing for portable cameras having solid-state imaging devices, such as a digital still camera and a camera installed in cellular phone. Imaging lenses to be used in such cameras are required to be installed within limited spaces, respectively, and are thus required to be further downsized as compared with typical lenses for silver salt cameras. Further, recent and drastic advancement of higher pixelation for solid-state imaging devices has resulted in strong demands for higher optical performance.

Various imaging lenses constituted of a small number of lenses have been proposed as ones suitable for small-sized solid-state imaging devices, respectively (for example, Japanese Patent Application Laid-Open Nos. 2004-102234, Japanese Patent Application Laid-Open No. 2004-53813). Imaging lenses described in the above patent documents are each constituted of four lenses such that an aperture-stop is arranged between a first lens and a second lens.

Recent rapid improvements of technologies have also promoted downsizing of cellular phones, mobile devices, and the like. Thus, lenses to be used in such compact devices are also demanded to be downsized in outer diameter and shortened in total length. Further, advancement of higher pixelation for solid-state imaging devices such as CCD and CMOS leads to demands for higher-performance lenses to be used therefor.

When a conventional electronic shutter is used in a situation of advancement of higher pixelation for CCD, smear (phenomenon where streak-like light is caused vertically relative to an optical axis when a photograph including a strong light source such as sunlight or illumination light is taken by an imaging apparatus utilizing a CCD, for example) is caused to affect an image taken through a lens. To avoid occurrence of smear, a mechanical shutter (light-shielding plate) or the like is required. However, since the mechanical shutter has a certain thickness, the mechanical shutter is hardly used for an imaging lens installed in a cellular phone or mobile device that is required to be compact-sized.

SUMMARY OF THE INVENTION

It is an object of the present invention to at least solve the above problems in the conventional technologies.

An imaging lens according to one aspect of the present invention includes a first lens having a substantially convex surface, having a positive refractive power, and arrange so that the convex surface is on an object side; a second lens composed of a meniscus lens having a substantially concave surface, having a negative refractive power, and arranged so that the concave surface is on the object side; a third lens having substantially convex surfaces on both sides, and having a positive refractive power; and a fourth lens composed of a meniscus lens having a substantially convex surface, having a positive refractive power, and arranged so that the convex surface is on the object side. The first lens, the second lens, the third lens, and the fourth lens are arranged in order from the object side so that lens apertures are configured to be stepwise increased from the first lens toward the fourth lens, and a space is provided between the first lens and the second lens.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
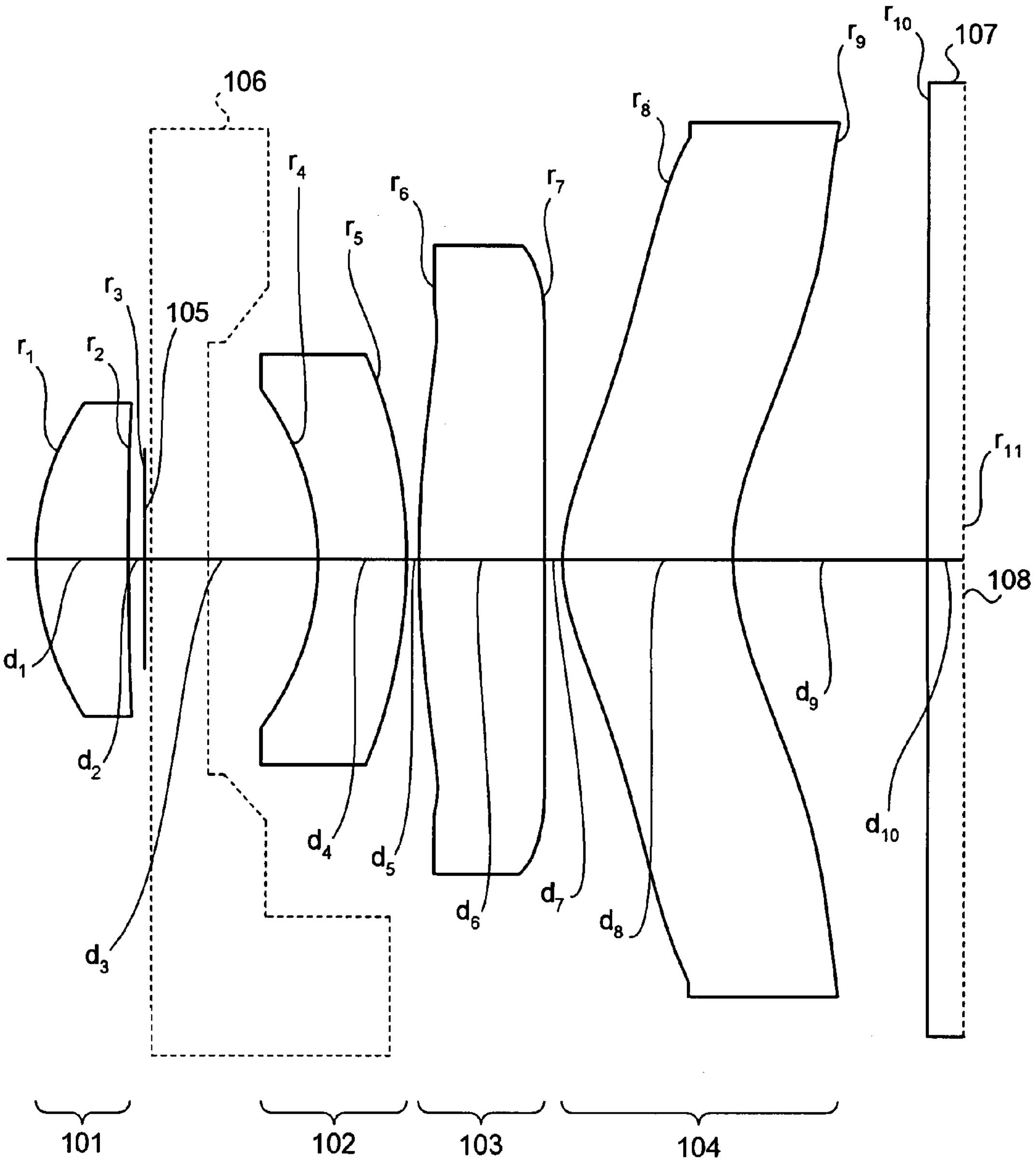
FIG. 1 illustrates a configuration of an imaging lens according to a first example on a cross-section along an optical axis.

Exemplary embodiments according to the present invention will be explained in detail below with reference to the accompanying drawings.

The imaging lens according to embodiments of the present invention includes, in an order arranged from an object side, a first lens constituted of a meniscus lens having a substantially convex surface formed at the object side and having a positive refractive power, a second lens constituted of a meniscus lens having a substantially concave surface formed at the object side and having a negative refractive power, a third lens having substantially convex surfaces formed at both sides, respectively, and having a positive refractive power, and a fourth lens constituted of a meniscus lens having a substantially convex surface at the object side and having a positive refractive power. Note that the first lens is not limited to the meniscus lens, and may be a double-convex lens.

The imaging lens according to the embodiment includes a diaphragm mechanism (such as mechanical shutter or adjustable diaphragm) between the first lens and the second lens, to avoid occurrence of smear. However, arrangement of the diaphragm mechanism in the optical system may rather obstruct compactization of the optical system. As such, to facilitate the arrangement of the diaphragm mechanism, an aperture of the first lens is made relatively small, and lens apertures are configured to be stepwise increased from the first lens toward the fourth lens, to define a space left near peripheries of the first lens and the second lens.

Further, various conditions are settled as follows, to ensure a space for arrangement of the diaphragm mechanism therein between the first lens and the second lens, without deteriorating a compact nature and an optical performance of the imaging lens.

First, it is desirable that the imaging lens satisfies the following conditional expression.

$$2Y/T \leqq 1.1 \quad (1)$$

where 2Y represents an effective image plane diagonal line length, and T represents a total length (including back focus).

This conditional expression (1) indicates a condition to define a ratio between the effective image plane diagonal line length and the optical system total length in the imaging lens to thereby shorten the total length of the imaging lens. Values of 2Y/T exceeding 1.1 disadvantageously lead to excessively lengthened total lengths of the imaging lens to be used in a digital still camera, a camera installed in cellular phone, and the like required to be downsized.

Next, it is desirable that the following conditional expression is satisfied.

$$2\omega \geqq 60° \qquad (2)$$

where 2ω represents an angle of view of the imaging lens.

The conditional expression (2) defines the angle of view of the imaging lens. Values of 2ω less than 60° fail to realize wide-angled imaging lenses.

The imaging lens according to the embodiment is made wide-angled with a shortened total length, by meeting the conditional expressions (1) and (2).

Further, it is desirable that the imaging lens satisfies the following conditional expression.

$$d_{12}-(S_2+S_3) \geqq 1.0 \qquad (3)$$

where $d_{12}$ represents a space between the first lens and the second lens, $S_2$ represents a curvature sag amount of an image side surface of the first lens (curvature sag amount at a height of an effective aperture+0.1 millimeter (mm) at each side), and, $S_3$ represents a curvature sag amount of the object side surface of the second lens (curvature sag amount at a height of an effective aperture+0.1 mm at each side).

The conditional expression (3) defines a condition to provide a space for arrangement of the diaphragm mechanism (such as mechanical shutter or adjustable diaphragm) in the optical system without obstructing compactization of the imaging lens. Meeting the conditional expression (3) enables a space of at least 1.0 mm to be ensured between the first lens and the second lens. This facilitates arrangement of the diaphragm mechanism between the first lens and the second lens. When $d_{12}-(S_2+S_3)$ is less than 1.0, it becomes difficult to arrange a diaphragm mechanism having a certain thickness between the first lens and the second lens.

Furthermore, it is desirable that the imaging lens satisfies the following conditional expression.

$$3.0 \leqq f_{12}/f \leqq 21.0 \qquad (4)$$

where $f_{12}$ represents a combined focal length of the first lens and the second lens, and f represents a focal length of the imaging lens as a whole system.

The conditional expression (4) defines a refractive power (inverse number of focal length) of the first lens and the second lens. Meeting the conditional expression (4) allows for restriction of occurrence of comatic aberration, high order spherical aberration, and image surface curvature of the imaging lens. Additionally, the refractive power of the first lens and the second lens is weakened to allow a space between the first lens and the second lens to be increased. Values of $f_{12}/f$ less than 3.0 enable shortening of the total length of the imaging lens, but fail to restrict occurrence of various aberrations. Values of $f_{12}/f$ exceeding 21.0 disadvantageously lead to a lengthened total length of the imaging lens and a considerable axial chromatic aberration.

It is desirable that the imaging lens satisfies the following conditional expression.

$$3.5 \leqq \nu d_1 nd_2 / \nu d_2 nd_1 \leqq 5.0 \qquad (5)$$

where $nd_1$ represents a refractive index of the first lens at d-line, $nd_2$ represents a refractive index of the second lens at d-line, $\nu d_1$ represents an Abbe number of the first lens at d-line, and $\nu d_2$ represents an Abbe number of the second lens at d-line.

The conditional expression (5) indicates a condition for realizing excellent correction of axial chromatic aberration and lateral chromatic aberration. Values of $\nu d_1 nd_2/\nu d_2 nd_1$ less than 3.5 and exceeding 5.0 disadvantageously lead to considerable axial chromatic aberrations and lateral chromatic aberrations.

The imaging lens according to the embodiment has an optical performance adaptable to a solid-state imaging device subjected to recent advancement of higher pixelation, and is basically constituted of four lenses. However, the imaging lens can also be constituted of three or less lenses including the first lens and the second lens that meet the conditional expressions (1) to (5), when further downsizing of an optical system is desired. An optical performance durable to practical usage can be obtained even by constitution of three or less lenses, insofar as the first lens and the second lens meeting the conditional expressions (1) to (5) are included.

Note that the effects prospected by the present invention can be obtained, insofar as the parameters included in the conditional expressions (1) to (5) take values near the defined ranges thereof, respectively.

Further, in the imaging lens according to the embodiment, the first lens is preferably molded of glass material. Molding the first lens of a glass material exhibiting a lower dispersion enables a reduced axial chromatic aberration. The second lens may be molded of any one of glass material and plastic material. The third lens and the fourth lens are preferably molded of plastic material. Adoption of plastic lenses as the third lens and the fourth lens enables the lenses to be lightweighted and formed into shapes exhibiting higher difficulties that can not be molded by glass molding. Additionally, compactization and higher-performances of the lenses are enabled.

In the imaging lens according to the embodiment, all the first through the fourth lenses each preferably include at least one surface formed as an aspherical surface. Formation of aspherical surfaces enables effective restriction of occurrence of spherical aberration, astigmatism, distortion, and the like, by a small number of lenses. This allows for realization of a compact and high-performance imaging lens.

As described above, the imaging lens according to the embodiment allows for arrangement of a diaphragm mechanism of a certain thickness in the optical system (between the first lens and the second lens). In this way, the arrangement of not a front diaphragm but the diaphragm in the optical system allows for obtainment of effects that (i) the optical performance is improved, (ii) the lens aperture backward the diaphragm can be downsized, and (iii) the diaphragm diameter can be reduced. Further, the space between the first lens and second lens can be ensured in a relatively wide manner in the imaging lens according to the embodiment, to enable arrangement of a mechanical shutter therein. Arrangement of the mechanical shutter provides such advantages that (iv) the volume of the shutter is reduced, and (v) the shutter speed can be gained.

As explained above, the embodiment allows for provision of a wide-angled, high-performance, and compact imaging lens. The imaging lens is made optimum for a digital still camera, a camera installed in cellular phone, and the like that are demanded to be downsized.

FIG. 1 illustrates a configuration of an imaging lens according to a first example on a cross-section along an optical axis. The imaging lens is configured to include, in an order arranged from a side of an object (not shown), a first lens 101 constituted of a meniscus lens having a substantially convex surface formed at the object side and having a positive refractive power, a second lens 102 constituted of a meniscus lens having a substantially concave surface formed at the object side and having a negative refractive power, a third lens 103 having substantially convex surfaces formed at both sides, respectively, and having a positive refractive power, and a fourth lens 104 constituted of a meniscus lens having a substantially convex surface at the object side and having a positive refractive power.

The imaging lens is configured so that the first lens 101 has an aperture smaller than apertures of the other lenses, and lens apertures are configured to be stepwise increased from the first lens 101 toward the fourth lens 104. This defines a space left near peripheries of the first lens 101 and the second lens 102. Further, a space of at least 1.0 mm is ensured between the first lens 101 and the second lens 102. This allows a diaphragm mechanism 106 of a certain thickness having a diaphragm 105 to be arranged between the first lens 101 and the second lens 102.

Arranged at an image surface side (right side in the figure) of the fourth lens 104 is a plane-parallel glass plate 107 having a function of low-pass filter. Note that the plane-parallel glass plate 107 is so arranged that a rear side surface thereof (right side in the figure) coincides with an image surface 108 of the imaging lens.

Note that the first lens 101 is molded of glass material. The second lens 102 is molded of glass material or plastic material. The third lens 103 and the fourth lens 104 are molded of plastic material. The lenses constituting the imaging lens according to the first example are each formed with an aspherical surface(s).

Listed below are various numerical value data concerning the imaging lens according to the first example.

Focal length (f) of whole imaging lens system=5.8

Combined focal length ($f_{12}$) of the first lens 101 and the second lens 102=22.47

F number=2.82

Effective image plane diagonal line length (2Y)=7.76

Edge-to-edge distance between the first lens 101 and the second lens 102=1.04

(Value Concerning the Conditional Expression (1))

$$2Y/T=1.026$$

(Value Concerning the Conditional Expression (2))

$$2\omega \text{ (angle of view)}=67.5°$$

(Values Concerning Conditional Expression (3))

Curvature sag amount ($S_2$) of the first lens 101 at image side surface=0.06

Curvature sag amount ($S_3$) of the second lens 102 at object side surface=0.44

$$d_{12}-(S_2+S_3)=1.042$$

(Value Concerning Conditional Expression (4))

$$f_{12}/f=3.87$$

(Value Concerning Conditional Expression (5))

$$\nu d_1 nd_2/\nu d_2 nd_1=4.41$$

$r_1$=2.238253 (aspherical surface)

$d_1$=0.74 $nd_1$=1.48749 $\nu d_1$=70.2

$r_2$=11.54829 (aspherical surface)

$d_2$=0.15989

$r_3$=∞ (diaphragm)

$d_3$=1.3821682

$r_4$=−3.043589 (aspherical surface)

$d_4$=0.7319547 $nd_2$=1.83918 $\nu d_2$=23.9

$r_5$=−25.12513 (aspherical surface)

$d_5$=0.1

$r_6$=9.673306 (aspherical surface)

$d_6$=1.032624 $nd_3$=1.5247 $\nu d_3$=56.2

$r_7$=−162.499 (aspherical surface)

$d_7$=0.15

$r_8$=1.592405 (aspherical surface)

$d_8$=1.387677 $nd_4$=1.5247 $\nu d_4$=56.2

$r_9$=1.877163 (aspherical surface)

$d_9$=1.57837

$r_{10}$=∞

$d_{10}$=0.3 $nd_5$=1.51823 $\nu d_5$=59.0

$r_{11}$=∞ (image surface)

Conical coefficient (ε) and aspherical surface coefficients ($A_2$, $A_3$, $A_4$, $A_5$, $A_6$, $A_7$, $A_8$, $A_9$, and $A_{10}$)

(First Surface)

ε=−2.749

$A_2$=0, $A_3$=−0.020179177, $A_4$=0.17723192, $A_5$=−0.48223105, $A_6$=1.002985, $A_7$=−1.263127, $A_8$=0.93938134, $A_9$=−0.38094406, and $A_{10}$=0.065279618

(Second Surface)

ε=−5.372

$A_2$=0, $A_3$=0.005308362, $A_4$=0, $A_5$=0, $A_6$=0, $A_7$=0, $A_8$=0, $A_9$=0, and $A_{10}$=0

(Fourth Surface)

ε=4.492

$A_2$=0, $A_3$=−0.069947445, $A_4$=0.048917291, $A_5$=0.050522635, $A_6$=−0.287727, $A_7$=0.3830593, $A_8$=−0.11332943, $A_9$=−0.088604422, and $A_{10}$=0.048027647

(Fifth Surface)

ε=−29.001

$A_2$=−0.013352, $A_3$=−0.080142644, $A_4$=0.030634998, $A_5$=−0.088163386, $A_6$=0.0911833, $A_7$=−0.0116, $A_8$=−0.021379303, $A_9$=0.008359511, and $A_{10}$=−0.000511628

(Sixth Surface)

ε=15.912

$A_2$=0, $A_3$=0, $A_4$=0.005960487, $A_5$=0, $A_6$=−0.002075, $A_7$=0, $A_8$=−0.000126275, $A_9$=0, and $A_{10}$=$-4.59732\times10^{-5}$ (Seventh Surface)

ε=1.000

$A_2$=0, $A_3$=0, $A_4$=−0.000361694, $A_5$=0, $A_6$=0.0029214, $A_7$=0, $A_8$=−0.000900392, $A_9$=0, and $A_{10}$=$5.33\times10^{-5}$ (Eighth Surface)

ε=−2.679

$A_2$=0, $A_3$=0.012449375, $A_4$=−0.036069033, $A_5$=0.003183183, $A_6$=0.0097421, $A_7$=−0.004032, $A_8$=$2.65657\times10^{-5}$, $A_9$=0.000253463, and $A_{10}$=$-3.57403\times10^{-5}$ (Ninth Surface)

ε=−0.999

Figure 2:
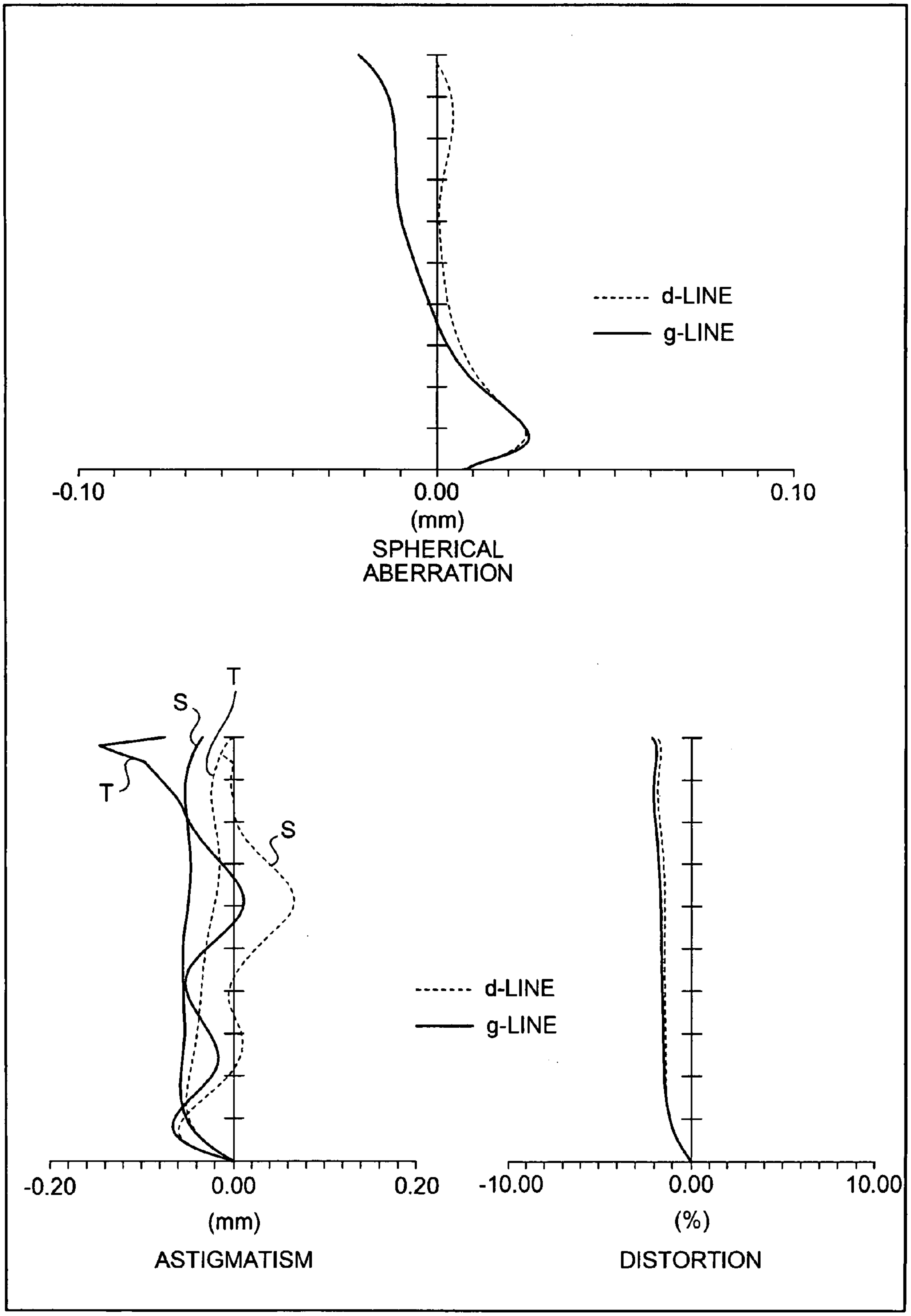
FIG. 2 is a graph of aberrations of the imaging lens according to the first example.
Figure 3:
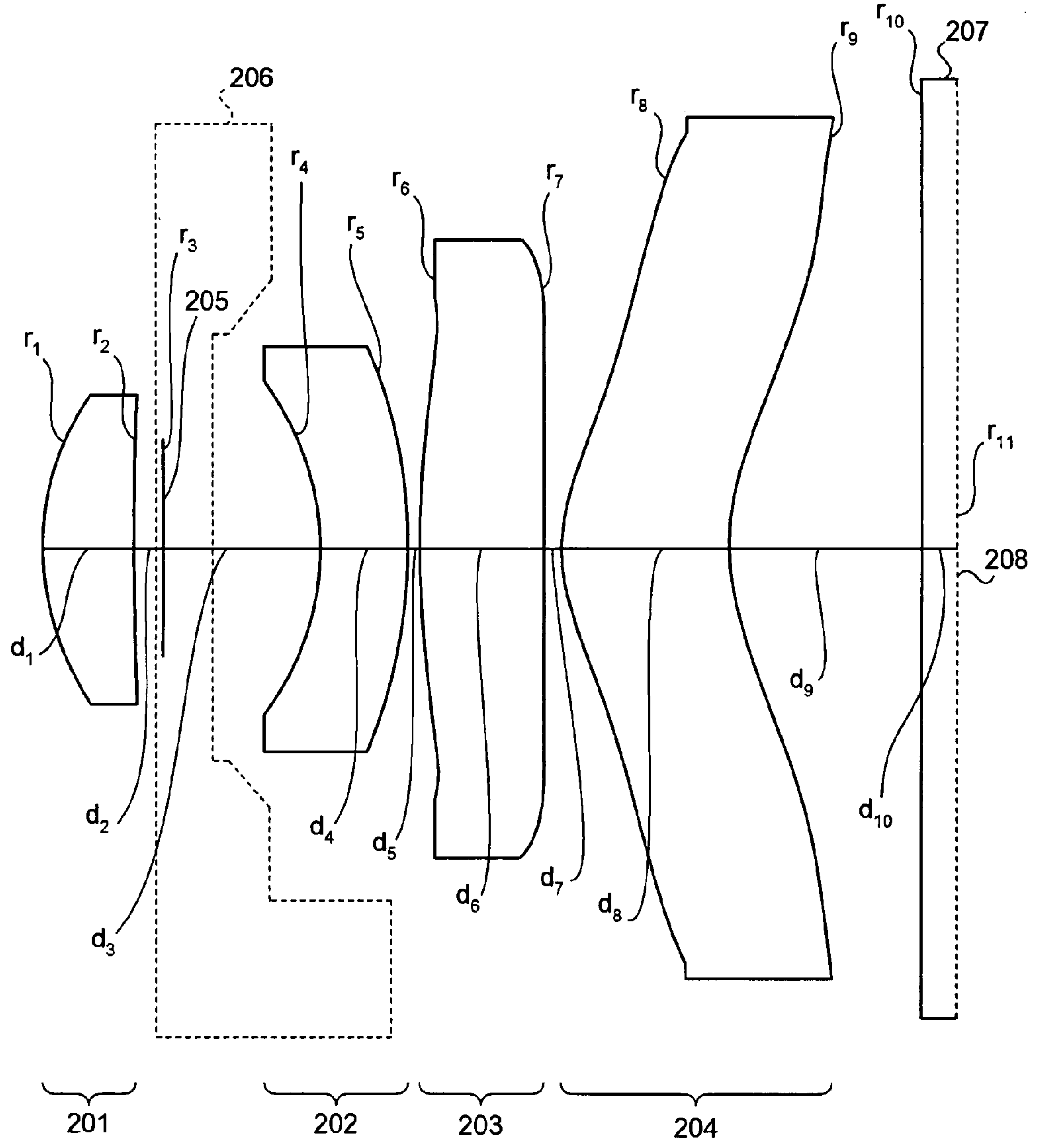
FIG. 3 illustrates a configuration of an imaging lens according to a second example on a cross-section along an optical axis.

$A_2$=0, $A_3$=0.035229275, $A_4$=−0.091092316, $A_5$=0.034157928, $A_6$=0.0039598, $A_7$=−0.005686, $A_8$=0.001264606, $A_9$=$-6.34677\times10^{-5}$, and $A_{10}$=$-4.28177\times10^{-6}$ FIG. 2 is a graph of aberrations of the imaging lens according to the first example. FIG. 3 illustrates a configuration of an imaging lens according to a second example on a cross-section along an optical axis. The imaging lens is configured to include, in an order arranged from a side of an object (not shown), a first lens 201 constituted of a meniscus lens having a substantially convex surface formed at the object side and having a positive refractive power, a second lens 202 constituted of a meniscus lens having a substantially concave surface formed at the object side and having a negative refractive power, a third lens 203 having substantially convex surfaces formed at both sides, respectively, and having a positive refractive power, and a fourth lens 204 constituted of a meniscus lens having a substantially convex surface at the object side and having a positive refractive power.

The imaging lens is configured so that the first lens 201 has an aperture smaller than apertures of the other lenses, and lens apertures are configured to be stepwise increased from the first lens 201 toward the fourth lens 204. This defines a space left near peripheries of the first lens 201 and the second lens 202. Further, a space of at least 1.0 mm is ensured between the first lens 201 and the second lens 202. This allows a diaphragm mechanism 206 of a certain thickness having a diaphragm 205 to be arranged between the first lens 201 and the second lens 202.

Arranged at an image surface side (right side in the figure) of the fourth lens 204 is a plane-parallel glass plate 207 having a function of low-pass filter. Note that the plane-parallel glass plate 207 is so arranged that a rear side surface thereof (right side in the figure) coincides with an image surface 208 of the imaging lens.

Note that the first lens 201 is molded of glass material. The second lens 202 is molded of glass material or plastic material. The third lens 203 and the fourth lens 204 are molded of plastic material. The lenses constituting the imaging lens according to the second example are each formed with an aspherical surface(s).

Listed below are various numerical value data concerning the imaging lens according to the second example.

Focal length (f) of whole imaging lens system=5.81

Combined focal length ($f_{12}$) of the first lens 201 and the second lens 202=17.81

F number=2.82

Effective image plane diagonal line length (2Y)=7.76

Edge-to-edge distance between the first lens 201 and the second lens 202=1.06

(Value Concerning the Conditional Expression (1))

$$2Y/T=1.025$$

(Value Concerning the Conditional Expression (2))

$$2\omega \text{ (angle of view)}=67.4°$$

(Values Concerning Conditional Expression (3))

Curvature sag amount ($S_2$) of the first lens 201 at image side surface=0.07

Curvature sag amount ($S_3$) of the second lens 202 at object side surface=0.41

$$d_{12}-(S_2+S_3)=1.062$$

(Value Concerning Conditional Expression (4))

$$f_{12}/f=3.07$$

(Value Concerning Conditional Expression (5))

$$\nu d_1 nd_2/\nu d_2 nd_1=3.63$$

$r_1$=2.254663 (aspherical surface)

$d_1$=0.76 $nd_1$=1.48563 $\nu d_1$=85.17

$r_2$=12.64306 (aspherical surface)

$d_2$=0.3420582

$r_3$=∞ (diaphragm)

$d_3$=1.2

$r_4$=−2.583553 (aspherical surface)

$d_4$=0.7114424 $nd_2$=1.83918 $\nu d_2$=23.9

$r_5$=−12.74665 (aspherical surface)

$d_5$=0.1

$r_6$=9.979898 (aspherical surface)

$d_6$=1.067804 $nd_3$=1.5247 $\nu d_3$=56.2

$r_7$=−60.37582 (aspherical surface)

$d_7$=0.15

$r_8$=1.720067 (aspherical surface)

$d_8$=1.34979 $nd_4$=1.5247 $\nu d_4$=56.2

$r_9$=1.90474 (aspherical surface)

$d_9$=1.5926

$r_{10}$=∞

$d_{10}$=0.3 $nd_5$=1.51823 $\nu d_5$=59.0

$r_{11}$=∞ (image surface)

Conical coefficient (ε) and aspherical surface coefficients ($A_2$, $A_3$, $A_4$, $A_5$, $A_6$, $A_7$, $A_8$, $A_9$, and $A_{10}$)

(First Surface)

ε=−2.631

$A_2$=0, $A_3$=−0.019614572, $A_4$=0.17580831, $A_5$=−0.48279879, $A_6$=1.0023162, $A_7$=−1.262851, $A_8$=0.94018122, $A_9$=−0.3805329, and $A_{10}$=0.064742684

(Second Surface)

ε=−28.642

$A_2$=0, $A_3$=0.006821142, $A_4$=0, $A_5$=0, $A_6$=0, $A_7$=0, $A_8$=0, $A_9$=0, and $A_{10}$=0

(Fourth Surface)

ε=1.917

$A_2$=0, $A_3$=−0.070702628, $A_4$=0.055661606, $A_5$=0.05235417, $A_6$=−0.294228, $A_7$=0.3766537, $A_8$=−0.1127341, $A_9$=−0.078598071, and $A_{10}$=0.041538885

(Fifth Surface)

ε=−29.000

$A_2$=−0.031894, $A_3$=−0.07095233, $A_4$=0.035113923, $A_5$=−0.089401839, $A_6$=0.0904777, $A_7$=−0.011801, $A_8$=−0.021346235, $A_9$=0.00843223, and $A_{10}$=−0.000433712

(Sixth Surface)

ε=17.350

$A_2$=0, $A_3$=0, $A_4$=0.003940492, $A_5$=0, $A_6$=−0.001858, $A_7$=0, $A_8$=−0.000274411, $A_9$=0, and $A_{10}$=$-3.89779\times10^{-5}$ (Seventh Surface)

ε=33.941

$A_2$=0, $A_3$=0, $A_4$=−0.000728376, $A_5$=0, $A_6$=0.0024779, $A_7$=0, $A_8$=−0.000847246, $A_9$=0, and $A_{10}$=$4.98456\times10^{-5}$ (Eighth Surface)

ε=−3.288

$A_2$=0, $A_3$=0.015476854, $A_4$=−0.037046548, $A_5$=0.003234767, $A_6$=0.0097854, $A_7$=−0.004021, $A_8$=$2.80086\times10^{5}$, $A_9$=0.000253234, and $A_{10}$=$-3.60336\times10^{-5}$ (Ninth Surface)

ε=−0.887

Figure 4:
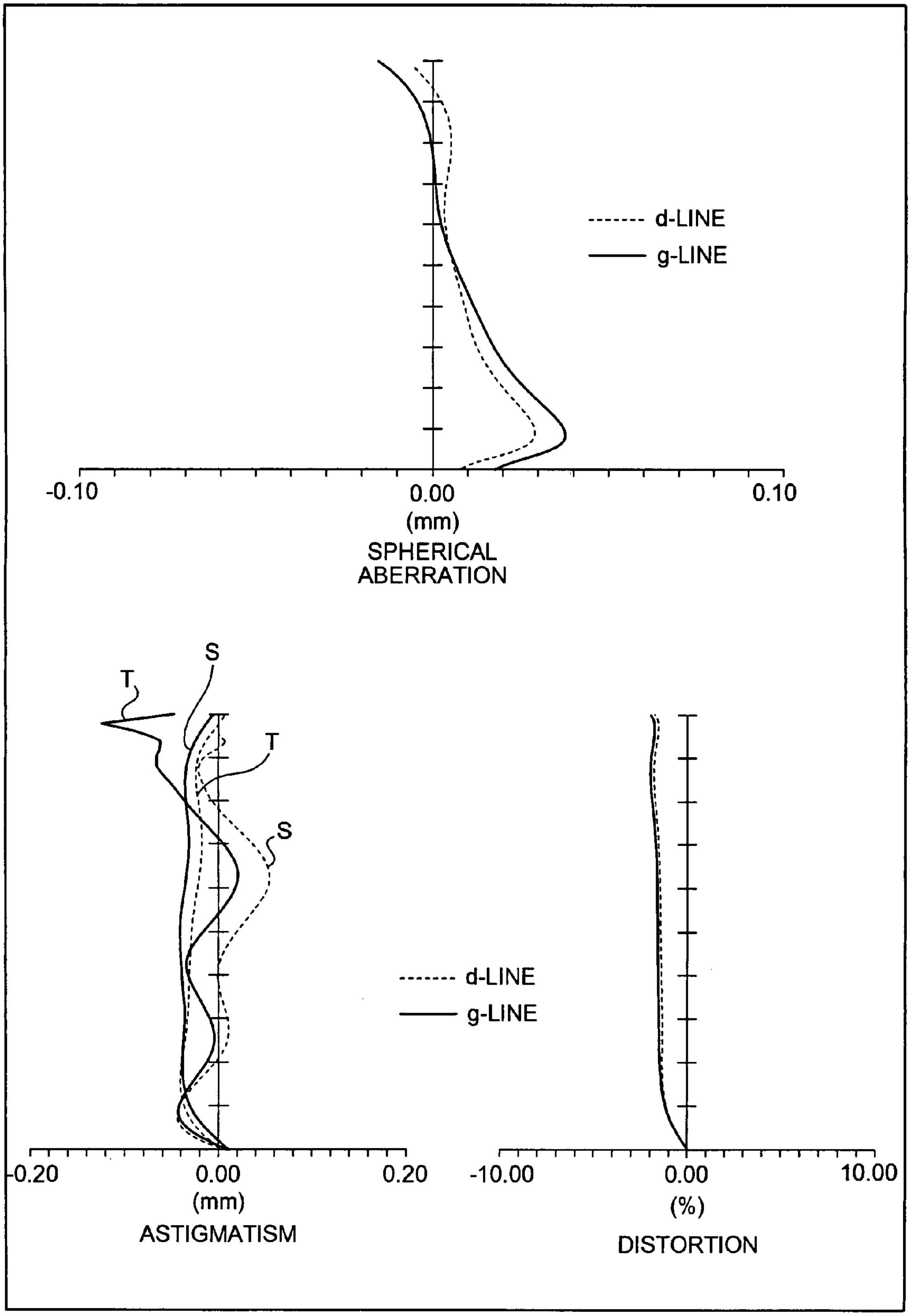
FIG. 4 is a graph of aberrations of the imaging lens according to the second example.

$A_2$=0, $A_3$=0.026992097, $A_4$=−0.089409458, $A_5$=0.034200504, $A_6$=0.0039075, $A_7$=−0.005684, $A_8$=0.00127058, $A_9$=$-6.23276\times10^{-5}$, and $A_{10}$=$-4.83813\times10^{-6}$ FIG. 4 is a graph of aberrations of the imaging lens according to the second example. Note that, in the numerical value data, $r_1$, $r_2$ and so forth represent radii of curvature of the lenses, diaphragm surface, and the like, respectively; $d_1$, $d_2$, and so forth represent wall thicknesses or surface separations of the lenses, diaphragm, and the like, respectively; $nd_1$, $nd_2$, and so forth represent refractive indexes of lenses at d-line, respectively; and $\nu d_1$, $\nu d_2$, and so forth represent Abbe numbers of lenses at d-line, respectively.

The aspherical surface shapes can be each represented by the following equation, where a Z axis is set in an optical axis direction, an H axis is set in a direction orthogonal to the optical axis, and a traveling direction of light is positive:

$$Z = \frac{H^2/r}{1+\sqrt{1-(\varepsilon H^2/r^2)}} + A_2H^2 + A_3H^3 + A_4H^4 + A_5H^5 + A_6H^6 + A_7H^7 + A_8H^8 + A_9H^9 + A_{10}H^{10} \quad (6)$$

Where r represents a paraxial radius of curvature, ε represents a conical coefficient, and $A_2$, $A_3$, $A_4$, $A_5$, $A_6$, $A_7$, $A_8$, $A_9$, and $A_10$ represent aspherical surface coefficients at a second, a third, a fourth, a fifth, a sixth, a seventh, an eighth, a ninth, and a tenth orders, respectively.

As explained above, the imaging lenses according to the examples each allow for arrangement of a diaphragm mechanism such as a mechanical shutter or adjustable diaphragm in the optical system without losing the compact nature and the higher optical performance of the optical system, by meeting the conditional expressions.

Further, the imaging lenses according to the examples are each configured to include lenses formed with aspherical surfaces, respectively, thereby enabling various aberrations to be satisfactorily corrected by a small number of lenses. Adoption of plastic lenses as the third lens and the fourth lens enables the lenses to be light-weighted and formed into shapes exhibiting higher difficulties that can not be molded by glass molding. Additionally, compactization and higher-performances of the lenses are enabled.

According to the embodiments described above, an imaging lens can be effectively provided that is capable of arranging a diaphragm mechanism such as a mechanical shutter or adjustable diaphragm in an optical system, without losing the compact nature and the higher optical performance of the optical system.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2006-049925 filed in Japan on Feb. 27, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An imaging lens comprising:

a first lens having a substantially convex surface, having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side, wherein the first lens, the second lens, the third lens, and the fourth lens are arranged in order from the object side so that lens apertures are configured to be stepwise increased from the first lens toward the fourth lens, and a space is provided between the first lens and the second lens, wherein surfaces of the lens are aspherical.

2. An imaging lens comprising:

a first lens having a substantially convex surface. having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side, wherein the first lens, the second lens, the third lens, and the fourth lens are arranged in order from the object side so that lens apertures are configured to be stepwise increased from the first lens toward the fourth lens, a space is provided between the first lens and the second lens, and the imaging lens is arranged so as to satisfy a conditional expression including $$2Y/T \leqq 1.1$$

$$2\omega \geqq 60°$$

wherein 2Y represents an effective image plane diagonal line length of the imaging lens, T represents a total length including back focus of the imaging lens, and 2 ω represents an angle of view of the imaging lens.

3. The imaging lens according to claim 2, wherein the imaging lens is arranged so as to satisfy a conditional expression including $$3.5 \leqq \nu d_1 nd_2 / \nu d_2 nd_1 \leqq 5.0$$

where $nd_1$ represents a refractive index of the first lens at a d-line, $nd_2$ represents a refractive index of the second lens at a d-line, $\nu d_1$ represents an Abbe number of the first lens at a d-line, and $\nu d_2$ represents an Abbe number of the second lens at a d-line.

4. An imaging lens comprising:

a first lens having a substantially convex surface, having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side, wherein the first lens, the second lens, the third lens, and the fourth lens are arranged in order from the object side so that lens apertures are configured to be stepwise increased from the first lens toward the fourth lens, a space is provided between the first lens and the second lens, and wherein the imaging lens is arranged so as to satisfy a conditional expression including $$d_{12} - (S_2 + S_3) \geqq 1.0$$

where $d_{12}$ represents a space between the first lens and the second lens, $S_2$ represents a curvature sag amount of an imaging surface of the first lens, and $S_3$ represents a curvature sag amount of an object side surface of the second lens, the curvature sag amount at a height of an effective aperture+0.1 mm at each side.

5. The imaging lens according to claim 4, wherein the imaging lens is arranged so as to satisfy a conditional expression including $$3.0 \leqq f_{12}/f \leqq 21.0$$

where $f_{12}$ represents a combined focal length of the first lens and the second lens, and f represents a focal length of the imaging lens as a whole system.

6. An imaging lens comprising:

a first lens having a substantially convex surface having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side, wherein the first lens, the second lens, the third lens, and the fourth lens are arranged in order from the object side so that lens apertures are configured to be stepwise increased from the first lens toward the fourth lens, a space is provided between the first lens and the second lens, the imaging lens is arranged so as to satisfy a conditional expression including $$d_{12}-(S_2+S_3) \geqq 1.0$$

where $d_{12}$ represents a space between the first lens and the second lens, $S_2$ represents a curvature sag amount of an imaging surface of the first lens, and $S_3$ represents a curvature sag amount of an object side surface of the second lens, and the imaging lens is arranged so as to satisfy a conditional expression including $$3.5 \leqq \nu d_1 nd_2 / \nu d_2 nd_1 \leqq 5.0$$

where $nd_1$ represents a refractive index of the first lens at a d-line, $nd_2$ represents a refractive index of the second lens at a d-line, $\nu d_1$ represents an Abbe number of the first lens at a d-line, and $\nu d_2$ represents an Abbe number of the second lens at a d-line.

7. An imaging lens comprising:

a first lens having a substantially convex surface, having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side, wherein the first lens, the second lens, the third lens, and the fourth lens are arranged in order from the object side so that lens apertures are configured to be stepwise increased from the first lens toward the fourth lens, a space is provided between the first lens and the second lens, the imaging lens is arranged so as to satisfy a conditional expression including $$3.0 \leqq f_{12}/f \leqq 21.0$$

where $f_{12}$ represents a combined focal length of the first lens and the second lens, and f represents a focal length of the imaging lens as a whole system, and the imaging lens is arranged so as to satisfy a conditional expression including $$3.5 \leqq \nu d_1 nd_2 / \nu d_2 nd_1 \leqq 5.0$$

where $nd_1$ represents a refractive index of the first lens at a d-line, $nd_2$ represents a refractive index of the second lens at a d-line, $\nu d_1$ represents an Abbe number of the first lens at a d-line, and $\nu d_2$ represents an Abbe number of the second lens at a d-line.

8. An imaging lens comprising:

a first lens having a substantially convex surface, having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side, wherein the first lens, the second lens, the third lens, and the fourth lens are arranged in order from the object side so that lens apertures are configured to be stepwise increased from the first lens toward the fourth lens, a space is provided between the first lens and the second lens, and the imaging lens is arranged so as to satisfy a conditional expression including $$3.5 \leqq \nu d_1 nd_2 / \nu d_2 nd_1 \leqq 5.0$$

wherein $nd_1$ represents a refractive index of the first lens at a d-line, $nd_2$ represents a refractive index of the second lens at a d-line, $\nu d_1$ represents an Abbe number of the first lens at a d-line, and $\nu d_2$ represents an Abbe number of the second lens at a d-line.

9. The imaging lens according to claim 8, wherein the imaging lens is arranged so as to satisfy a conditional expression including $$d_{12}-(S_2+S_3) \geqq 1.0$$

where $d_{12}$ represents a space between the first lens and the second lens, $S_2$ represents a curvature sag amount of an imaging surface of the first lens, and $S_3$ represents a curvature sag amount of an object side surface of the second lens, the curvature sag amount at a height of an effective aperture+0.1 mm at each side.

10. An imaging lens comprising:

a first lens having a substantially convex surface, having a positive refractive power, and arranged so that the convex surface of the first lens is on an object side;

a second lens comprising a meniscus lens having a substantially concave surface, having a negative refractive power, and arranged so that the concave surface of the second lens is on the object side;

a third lens having substantially convex surfaces on both sides, and having a positive refractive power; and a fourth lens comprising a meniscus lens having a substantially convex surface, having a positive refractive power, and arranged so that the convex surface of the fourth lens is on the object side; and a diaphragm mechanism arranged between the first lens and the second lens, wherein the first lens, the second lens, the third lens, and the fourth lens are arranged in order from the object side so that lens apertures are configured to be stepwise increased from the first lens toward the fourth lens, a space is provided between the first lens and the second lens, and the imaging lens is arranged so as to satisfy a conditional expression including $$3.0 \leqq f_{12}/f \leqq 21.0$$

where $f_{12}$ represents a combined focal length of the first lens and the second lens, and f represents a focal length of the imaging lens as a whole system.

11. The imaging lens according to claim 10, wherein the imaging lens is arranged so as to satisfy a conditional expression including $$d_{12}-(S_2+S_3) \geqq 1.0$$

where $d_{12}$ represents a space between the first lens and the second lens, $S_2$ represents a curvature sag amount of an imaging surface of the first lens, and $S_3$ represents a curvature sag amount of an object side surface of the second lens, the curvature sag amount at a height of an effective aperture+0.1 mm at each side.

12. The imaging lens according to claim 10, wherein the imaging lens is arranged so as to satisfy a conditional expression including $$3.5 \leqq \nu d_1 nd_2/\nu d_2 nd_1 \leqq 5.0$$

where $nd_1$ represents a refractive index of the first lens at a d-line, $nd_2$ represents a refractive index of the second lens at a d-line, $\nu d_1$ represents an Abbe number of the first lens at a d-line, and $\nu d_2$ represents an Abbe number of the second lens at a d-line.

* * * * *